US011867314B2

(12) United States Patent
Lesage et al.

(10) Patent No.: US 11,867,314 B2
(45) Date of Patent: Jan. 9, 2024

(54) METHOD AND APPARATUS FOR ENERGISING A SOLENOID OF A VALVE ASSEMBLY

(71) Applicant: FAS MEDIC S.A., Palezieux (CH)

(72) Inventors: Romain Lesage, Thorens Glieres (FR); Vincent Tanari, Satigny (CH)

(73) Assignee: FAS MEDIC S.A., Palézieux (CH)

( * ) Notice: Subject to any disclaimer, the term of this patent is extended or adjusted under 35 U.S.C. 154(b) by 545 days.

(21) Appl. No.: 17/059,847

(22) PCT Filed: May 28, 2019

(86) PCT No.: PCT/EP2019/063884
§ 371 (c)(1),
(2) Date: Nov. 30, 2020

(87) PCT Pub. No.: WO2019/229093
PCT Pub. Date: Dec. 5, 2019

(65) Prior Publication Data
US 2021/0222795 A1 Jul. 22, 2021

(30) Foreign Application Priority Data

May 31, 2018 (GB) ........................... 1808885

(51) Int. Cl.
*F16K 37/00* (2006.01)
*F16K 31/06* (2006.01)
(Continued)

(52) U.S. Cl.
CPC ...... *F16K 37/0041* (2013.01); *F16K 31/0675* (2013.01); *H01F 7/064* (2013.01); *H01F 7/081* (2013.01)

(58) Field of Classification Search
USPC .......................................................... 702/34
See application file for complete search history.

(56) References Cited

U.S. PATENT DOCUMENTS 3,852,646 A 12/1974 Mason
4,726,389 A 2/1988 Minoura et al.
(Continued)

FOREIGN PATENT DOCUMENTS

CN 102753873 A 10/2012
CN 202676876 U 1/2013
(Continued)

OTHER PUBLICATIONS

Patents Act 1977: Examination Report Under Section 18(3) dated Jun. 9, 2022 for GB Patent Application No. GB1808885.6.
(Continued)

*Primary Examiner* — Paul D Lee
(74) *Attorney, Agent, or Firm* — Young Basile Hanlon & MacFarlane, P.C.

(57) ABSTRACT

There is provided a method of energising a solenoid of a valve assembly, comprising the steps of applying a positive over boost voltage to the solenoid to actuate a moveable plunger to open or close a flow path through the valve assembly, and then applying a negative braking voltage to brake the movement of the plunger during movement of the moveable plunger. There is also provided a method of energising a solenoid of a valve assembly, the method comprising the steps of receiving a demand signal to actuate the valve, applying a wait time after receipt of the demand signal, applying a positive over boost voltage across the solenoid to actuate a moveable plunger to open or close a flow path through the valve assembly, monitoring the solenoid closure time, and adjusting one or more input variables in order to control the solenoid closure time. There is also provided a method of monitoring the solenoid closure time over a plurality of different energising and de-energising cycles of the solenoid and generating an output to indicate a need for valve maintenance. Finally, there is provided a (Continued)

controller and a valve assembly configured to perform these methods.

20 Claims, 8 Drawing Sheets

(51) Int. Cl.
  *H01F 7/06* (2006.01)
  *H01F 7/08* (2006.01)

(56) References Cited

U.S. PATENT DOCUMENTS

| | | | |
|---|---|---|---|
| 5,381,297 A | 1/1995 | Weber | |
| 5,749,388 A | 5/1998 | Elliott et al. | |
| 5,937,828 A | 8/1999 | Watanabe | |
| 6,019,441 A * | 2/2000 | Lloyd | B60T 8/36 303/157 |
| 6,386,229 B1 | 5/2002 | Morikawa et al. | |
| 2005/0030691 A1 | 2/2005 | Bolz et al. | |
| 2007/0291438 A1 | 12/2007 | Ahrens et al. | |
| 2011/0062358 A1 | 3/2011 | Kawamura et al. | |
| 2011/0114187 A1 | 5/2011 | Sawaski | |
| 2011/0214741 A1 | 9/2011 | Fukano et al. | |
| 2012/0038336 A1 | 2/2012 | Zahrt | |
| 2012/0126783 A1 | 5/2012 | Jefremow et al. | |
| 2013/0032738 A1 * | 2/2013 | Wilms | F02D 41/20 251/129.01 |
| 2014/0092516 A1 | 4/2014 | Koch et al. | |
| 2015/0377173 A1 | 12/2015 | Tritsch et al. | |
| 2016/0281624 A1 | 9/2016 | Dames et al. | |
| 2017/0067408 A1 | 3/2017 | Probst | |
| 2017/0179865 A1 | 6/2017 | Omekanda et al. | |
| 2018/0172174 A1 * | 6/2018 | Gardt | B60T 8/341 |
| 2021/0148297 A1 * | 5/2021 | Baur | F02D 41/2467 |

FOREIGN PATENT DOCUMENTS

| | | | |
|---|---|---|---|
| CN | 110630806 A | 12/2019 | |
| DE | 3807278 A1 | 5/1996 | |
| DE | 29521124 U1 | 10/1996 | |
| DE | 10011924 A1 | 9/2001 | |
| DE | 102016205268 B3 | 6/2017 | |
| EP | 0109155 A1 | 5/1984 | |
| EP | 0704096 B1 | 9/1997 | |
| EP | 0851164 A3 | 5/1999 | |
| EP | 773394 B1 | 9/1999 | |
| EP | 1130300 A1 | 9/2001 | |
| EP | 1167729 B1 | 3/2005 | |
| EP | 1746318 B1 | 11/2007 | |
| EP | 1579108 B1 | 12/2007 | |
| EP | 2516905 B1 | 11/2013 | |
| EP | 2886920 A1 | 6/2015 | |
| EP | 2845215 B1 | 8/2016 | |
| EP | 3051108 A1 | 8/2016 | |
| EP | 2053225 A3 | 5/2017 | |
| EP | 2613044 A1 | 4/2018 | |
| FR | 2992681 B1 | 8/2014 | |
| JP | H09306732 A | 11/1997 | |
| JP | H1026245 A | 1/1998 | |
| JP | 4030403 B2 | 1/2008 | |
| JP | 2014163475 A | 9/2014 | |
| WO | 2007005424 A1 | 1/2007 | |
| WO | 2010141241 A4 | 4/2011 | |
| WO | 2014124507 A1 | 8/2014 | |
| WO | 2015021163 A3 | 4/2015 | |
| WO | 16209522 A1 | 12/2016 | |
| WO | 2017063824 A1 | 4/2017 | |

OTHER PUBLICATIONS

Notification of the First Office Action dated May 5, 2022 for Chinese Patent Application No. 201980051283.3, 8 pages.
Patents Act 1977, Further Search Report Under Section 17, Claims 14-24, 27, and 28, dated Feb. 20, 2020 for GB Patent Application No. GB1808885.6.
Patents Act 1977, Further Search Report Under Section 17, Claims 25-28, dated Feb. 20, 2020 for GB Patent Application No. GB1808885.6.
International Search Report dated Oct. 2, 2019 for PCT Patent Application No. PCT/EP2019/063884.

* cited by examiner

METHOD AND APPARATUS FOR ENERGISING A SOLENOID OF A VALVE ASSEMBLY

CROSS-REFERENCE TO RELATED APPLICATIONS

This application is a United States national stage application of, and claims priority to, International Application No. PCT/EP2019/063884 filed May 28, 2019, which was published as International Publication No. WO 2019/229093 A2 and which claims the benefit of GB Patent Application No. 1808885.6, filed May 31, 2018.

FIELD OF THE INVENTION

The present invention relates to a method of energising a solenoid of a valve assembly, in particular, a method of energising a solenoid by applying different voltage levels and a method of operating a solenoid valve assembly with improved speed, precision and an improved lifetime.

BACKGROUND TO THE INVENTION

Solenoid valve assemblies are used in a wide range of applications due to their fast and safe switching characteristics, these applications including heat exchangers, pneumatic and hydraulic systems, compressed air systems, domestic appliances such as washing machines and dishwashers, medical and life sciences applications, transport, industry and the food and beverage sectors.

In such valve assemblies, an electric current is applied through a solenoid which energises it and the magnetic field that is created as a result controls the movement of a magnetic plunger that opens and closes the valve, thus allowing or preventing fluid from flowing through the valve. Typically, when the solenoid is energised, the plunger overcomes the force of a spring that holds the plunger upon a fixed core, and the associated fluidic parts in a normally open or normally closed position (thus creating a seal towards or away from the valve seat). After the end of movement of the plunger, a hold voltage may be applied to the solenoid in order to retain the valve in a closed or open position and save power. Sometimes, a braking voltage is also applied in order to brake the movement of the plunger so as to lessen its impact upon the fixed core or impact of the seal upon the valve seat.

One way in which to control the various voltages that are applied to the solenoid is by using pulse width modulation (PWM) schemes controlled by an electronic control unit (ECU). A drive signal from the ECU denoting a duty cycle of 100% results in a maximum voltage being applied to the solenoid whereas a reduced duty cycle of lower than 100% results in a lower voltage being applied to the solenoid. By experimenting with different duty cycles, an optimum duty cycle can be found for a particular valve that adequately controls the movement of the plunger.

More recently, it has been proposed to, in addition to PWM schemes, apply different duty cycle signals to the solenoid in order to control movements of the plunger. An example of a solenoid valve assembly that utilises a method of this sort in order to reduce noise is disclosed in EP 1 130 300 A1. In the assembly of EP 1 130 300 A1, a sequence of variable duty cycles from 0 to 100% is used to brake the plunger.

However, challenges arise in operating the movement of the plunger accurately (so as to ensure that the plunger reaches its final position) and reliably (so as to ensure that a consistent movement of the plunger is achieved each time the solenoid is energised). Further, considerations must be taken in order to improve the lifetime of the solenoid valve assembly. For example, the lifetime of the solenoid valve assembly may be limited if the voltage applied to the solenoid is too high and the plunger impacts the fixed core or a seal impacts the valve seat too violently. Yet further, considerations must be taken in order to optimise the opening and closing times of the plunger and/or the wait time applied between consecutive instances of energising and de-energising the solenoid.

There is therefore an ongoing need for improvements in the way in which solenoid valve assemblies are controlled.

SUMMARY OF THE INVENTION

The present inventors have recognised that methods of operating solenoid valve assemblies to improve the techniques for controlling the movement of the plungers are required. In particular, the present inventors have recognised that many of the parameters for controlling movement of the plunger are related and that adjustments made to one control parameter may influence other control parameters in different ways.

Thus, according to a first aspect of the invention, there is provided a method of energising a solenoid of a valve assembly, wherein the solenoid is driven by a drive voltage, the method comprising the steps of: applying a positive overboost voltage across the solenoid to actuate a moveable plunger to open or close a flow path through the valve assembly, wherein the overboost voltage comprises a voltage sufficient to dissipate at least two times the nominal power of the valve assembly if the overboost voltage were applied for a time period sufficient to allow the current through the solenoid to reach a steady state; and then applying a negative braking voltage across the solenoid to brake the movement of the plunger, by actively connecting a braking device across the solenoid during movement of the moveable plunger.

The effect of applying the overboost voltage is that it accelerates movement of the moveable plunger and the effect of applying the braking voltage is that it decelerates movement of the moveable plunger. Since applying the braking voltage occurs before the end of movement of the moveable plunger and has the effect of decelerating the moveable plunger, the impact of the moveable plunger on its end stop (e.g. the valve seat for a normally open valve, or a mechanical counterpart for a normally closed valve) is softened.

The "nominal power" may be understood to mean the root mean square power that the valve assembly is able to withstand over an extended period of time. A valve assembly operating at the nominal power for an extended period of time preferably does not damage the solenoid or other components of the valve assembly.

The positive overboost voltage creates a force that allows the movable plunger to be actuated sufficiently to open or close a flow path through the valve assembly. An "overboost voltage" is preferably a voltage that is sufficient to dissipate at least two times the nominal power of the valve assembly if the overboost voltage were applied for a time period sufficient to allow the current through the solenoid to reach a steady state, or in other words, a voltage that boosts in excess, and which is higher than a regular boost voltage used in the prior art.

Whilst it is beneficial for the overboost voltage to be sufficient to dissipate a factor of at least two times the nominal power of the valve assembly if the overboost voltage were applied for a time period sufficient to allow the current through the solenoid to reach a steady state, in some examples, the factor may be much higher, for example, at least four times, at least nine times, at least 18 times or at least 36 times.

The force on the moveable plunger that results from the application of the overboost voltage may initiate movement of the moveable plunger, but more importantly, it accelerates the moveable plunger in a direction away from or towards the valve seat, depending on whether the valve assembly is normally open or normally closed; the higher the factor of the overboost voltage relative to the nominal power of the valve assembly, the higher the acceleration. For a normally open valve, the positive overboost voltage acts to close the flow path through the valve by accelerating it towards the valve seat, and for a normally closed valve, the positive overboost voltage acts to open the flow path through the valve by accelerating it away from the valve seat.

The negative braking voltage creates a force that acts on the moveable plunger in the opposite direction to the force created by the positive overboost voltage. It therefore decelerates the moveable plunger in the direction away from or towards the valve seat. The moveable plunger may reach the end of its movement in its path during application of the braking voltage. However, the braking voltage may be applied and removed before the end of movement of the moveable plunger. Preferably, actively connecting the braking device may cause dissipation of heat. This can be the case when the braking device is a resistor or a Zener diode, inter alia, other braking components.

A single negative braking voltage may be applied across the solenoid or a series of negative braking pulses may be applied in order to achieve the deceleration. The braking effect provided by a braking device with a negative braking voltage is more effective in braking the movement of the plunger than a 0% duty signal (0 Vdc) provided by EP 1 130 300 A1, for example.

Advantageously, the combination of the positive overboost voltage and the subsequent negative braking voltage provides a method of actuating a moveable plunger of a solenoid valve assembly whereby sufficient force is created by the positive overboost voltage so as to accelerate the moveable plunger to complete its path, yet the final impact that the moveable plunger has upon the valve seat (or other mechanical counterpart) is softened by the opposing force created by the braking voltage as it decelerates movement of the moveable plunger. Thus, the lifetime of the valve assembly is improved and a highly repeatable result is achieved.

In many valves, but in particular for applications utilising small and high speed valves having plunger movements of the order of 0.2 mm and plunger speeds of the order of 1 m/s, it is important that small movement of the moveable plunger is controlled accurately so that the moveable plunger reliably reaches its end position during each energisation cycle of the valve assembly, but it is also important that the impact of the moveable plunger upon the valve seat (or other mechanical counterpart) is not too great. The benefits provided by the claimed invention are particularly useful in valve assemblies configured to allow plunger movements of less than 1 mm, preferably less than 0.5 mm, more preferably less than 0.2 mm, and yet more preferably less than 0.1 mm.

At least the following two approaches may be taken in order to achieve a suitable positive overboost voltage that preferably causes dissipation of at least two times the nominal power of the valve assembly if the overboost voltage were applied for a time period sufficient to allow the current through the solenoid to reach a steady state.

In some examples, the step of applying the overboost voltage may comprise applying the overboost voltage for a time period sufficient for the instantaneous power dissipated in the solenoid to reach a predetermined power level. The predetermined power level may be measured using any suitable measurement equipment or current sensor, or a magnetic sensor, for example. Advantageously, this method for applying the overboost voltage provides an accurate result; it may compensate for a variation of the initial value of the solenoid resistance and a variation of the value of the solenoid resistance according to the temperature.

In other examples, the overboost voltage may be applied for a predetermined period of time. The predetermined period of time could be, say, between 300 µs and 1100 µs, preferably between 500 µs and 900 µs, more preferably 700 µs. However, the predetermined period of time may vary from valve to valve; it is usually set during manufacture and then adjusted using empirical testing, if necessary.

In some preferable examples, the braking voltage may be applied for a predetermined period of time. The predetermined period of time could be, say, between 100 µs and 300 µs, preferably between 150 µs and 250 µs, more preferably 200 µs.

The method may further comprise regulating the drive voltage at a first regulating voltage between the overboost drive voltage and the steady state drive voltage for the nominal power of the valve assembly after applying the overboost voltage.

In addition, the method may further comprise regulating the drive voltage at a second regulating drive voltage between the first regulating drive voltage and the steady state drive voltage for the nominal power of the valve assembly after applying the first regulating voltage.

The method may further comprise adapting the overboost voltage to the lower first and/or second regulating voltage by controlling the voltage across the solenoid once the power has reached a predetermined level or by controlling the current through the solenoid once the current has reached a predetermined level.

In the step(s) of regulating the first and/or second regulating voltages, this may comprise reducing the duty cycle of a pulse width modulation signal to reduce the voltage across the solenoid or to reduce the current through the solenoid.

Additionally or alternatively, in the step(s) of regulating the first and/or second regulating voltages, this may comprise controlling a current by making a dynamic adjustment of the duty cycle of a pulse width modulation signal in order to regulate the coil current through the solenoid at a predetermined level.

The method may further comprise applying a "re-boost voltage" across the solenoid after applying the braking voltage, wherein the re-boost voltage comprises a voltage sufficient to dissipate at least the nominal power of the valve assembly if the re-boost voltage were applied for a time period sufficient to allow the current through the solenoid to reach a steady state. The moveable plunger may reach the end of its movement in its path during application of the re-boost voltage.

Preferably, the step of applying the re-boost voltage comprises applying the re-boost voltage for a time period sufficient for the instantaneous power dissipated in the solenoid to reach a predetermined power level. Alternatively, the re-boost voltage may be applied for a predetermined period of time.

Additionally or alternatively, the method preferably further comprises applying a hold voltage across the solenoid after applying the braking voltage, and optionally after applying the re-boost voltage.

The steps of applying a first and second regulating voltages, a re-boost voltage and a hold voltage all help to ensure that the plunger reaches its final position because they are all positive voltages. The selection of which of these voltages to apply across the solenoid, and the order in which they are applied, may depend upon the operating conditions of a specific valve assembly. However, the hold voltage is usually lower that the first and second regulating voltages, and much lower than the re-boost voltage.

The step of applying the hold voltage may comprise reducing the duty cycle of a pulse width modulation signal to reduce the voltage across the solenoid or to reduce the current through the solenoid. Alternatively, the step of applying the hold voltage may comprise controlling a current by making a dynamic adjustment of the duty cycle of a pulse width modulation signal in order to regulate the current through the solenoid at a predetermined level.

According to a second aspect of the present invention, there is provided: a method of energising a solenoid of a valve assembly, wherein the solenoid is driven by a drive voltage, the method comprising the steps of: receiving a demand signal to actuate the valve; applying a wait time after receipt of the demand signal, wherein the drive voltage during the wait time is substantially zero volts; applying a positive overboost voltage across the solenoid to actuate a moveable plunger to open or close a flow path through the valve assembly, wherein the overboost voltage comprises a voltage sufficient to dissipate at least two times the nominal power of the valve assembly if the overboost voltage were applied for a time period sufficient to allow the current through the solenoid to reach a steady state; monitoring the solenoid closure time; and adjusting one or more input variables in order to control the solenoid closure time.

The positive overboost voltage creates a force that allows the movable plunger to be actuated sufficiently to open or close a flow path through the valve assembly. An "overboost voltage" is preferably a voltage that is sufficient to dissipate at least two times the nominal power of the valve assembly if the overboost voltage were applied for a time period sufficient to allow the current through the solenoid to reach a steady state, or in other words, a voltage that boosts in excess, and which is higher than a regular boost voltage used in the prior art.

Whilst it is beneficial for the overboost voltage to be sufficient to dissipate a factor of at least two times the nominal power of the valve assembly if the overboost voltage were applied for a time period sufficient to allow the current through the solenoid to reach a steady state, in some examples, the factor may be much higher, for example, at least four times, at least nine times, at least 18 times or at least 36 times.

The force on the moveable plunger that results from the application of the overboost voltage may initiate movement of the moveable plunger, and it accelerates the moveable plunger in a direction away from or towards the valve seat, depending on whether the valve assembly is normally open or normally closed; the higher the factor of the overboost voltage relative to the nominal power of the valve assembly, the higher the acceleration. For a normally open valve, the positive overboost voltage acts to close the flow path through the valve by accelerating it towards the valve seat, and for a normally closed valve, the positive overboost voltage acts to open the flow path through the valve by accelerating it away from the valve seat.

By monitoring the closure time of the solenoid, it is possible to determine whether the solenoid closure time is within an optimal range, and if not, to determine which input variable(s) should be adjusted in order to optimise the closure time of the solenoid. One way in which the solenoid closure time may be detected is by detecting a discontinuity in the current response of the solenoid.

The input variables that can be adjusted include, inter alia, the wait time, the overboost time and the overboost voltage (further possible input variables will be described below). Perhaps the simplest way in which the time taken for the plunger to reach its final position, i.e. solenoid closure time, may be adjusted is by adjusting the wait time since the relationship is direct. However, it may be advantageous to make adjustments to the overboost to also adjust the maximum plunger speed or in cases where it is useful to re-set the wait time to a predetermined value when it reaches zero or too large a value.

Preferably, the solenoid closure time may be adjusted in response to a difference between the monitored solenoid closure time and a predetermined target solenoid closure time.

It may be advantageous to apply a hold voltage across the solenoid after applying the overboost voltage in order to help to ensure that the plunger reaches its final position.

A cycle of energising the solenoid may be defined to comprise at least the steps of applying a wait time and applying an overboost voltage. The step of adjusting one or more input variables in order to control the solenoid closure time may therefore comprise adjusting the wait time once every a first integer of cycles, and adjusting the overboost time and/or the overboost voltage once every a second integer of cycles. The first integer may be equal to the second integer in some examples. In other examples, the first integer may be different from, preferably lower than, the second integer.

Preferably, the method may further comprise applying a negative braking voltage across the solenoid after applying the overboost voltage by actively connecting a braking device across the solenoid. The brake time may be an input variable that is adjusted in order to control the solenoid closure time.

The method may further comprise applying a re-boost voltage across the solenoid after applying the braking voltage, wherein the re-boost voltage comprises a voltage sufficient to dissipate at least the nominal power of the valve assembly if the re-boost voltage were applied for a time period sufficient to allow the current through the solenoid to reach a steady state. The re-boost time and/or the re-boost voltage may be an input variable that is adjusted in order to control the solenoid closure time.

Preferably, the step of applying the re-boost voltage comprises applying the re-boost voltage for a time period sufficient for the instantaneous power dissipated in the solenoid to reach a predetermined power level. Alternatively, the re-boost voltage may be applied for a predetermined period of time.

According to a third aspect of the present invention, there is provided: a method of operating a solenoid valve assembly, the method comprising the steps of: monitoring the solenoid closure time over a plurality of different energising and de-energising cycles of the solenoid; and generating an output to indicate a need for valve maintenance based on changes to the monitored solenoid closure time between at least one first measured cycle and at least one second measured cycle.

Advantageously, this aspect of the present invention provides a preventative maintenance technique based on measured closure time. As such, the overall lifetime of the valve assembly may be improved.

The step of monitoring the solenoid closure time may preferably comprise monitoring the shape of the current response.

According to a fourth aspect of the present invention, there is provided a controller for controlling operation of a solenoid valve assembly, wherein the controller is configured to control the valve assembly to perform any of the methods as described above.

The controller may be an ECU, and it may further comprise one or more of the following features: a power supply, a current shunt and sensing unit, a braking component (which may be a resistor or a Zener diode), a brake drive (or any other switch), a freewheeling diode and a PWM drive (or any other current control switch).

According to a fifth aspect of the present invention, there is provided a valve assembly, comprising: a controller; a solenoid; and a moveable plunger, wherein the controller is configured to control the valve assembly to perform the any of the methods as described above.

It will be appreciated that various aspects and embodiments of the invention may work in combination. For example, the valve assembly of the fourth aspect may be configured to perform the methods of each of the first, second and thirds aspects. It will also be appreciated that features of the various aspects and embodiments may be interchanged. For example, the overboost voltage comprising a voltage sufficient to dissipate at least two times the nominal power of the valve assembly if the overboost voltage were applied for a time period sufficient to allow the current through the solenoid to reach a steady state, as defined in the first and second aspects, may also be applied to the third aspect.

BRIEF DESCRIPTION OF THE DRAWINGS

Embodiments of the present invention will now be described, by non-limiting example only, with reference to the accompanying drawings, in which.

DETAILED DESCRIPTION OF EMBODIMENTS

The following detailed description and Figures provide examples of how the present invention can be implemented and should not be seen as limiting examples, rather illustrations of how the various features of the turbines disclosed herein can be combined, although other optional combinations will be evident upon a reading of the following description in light of the figures.

Figure 1:
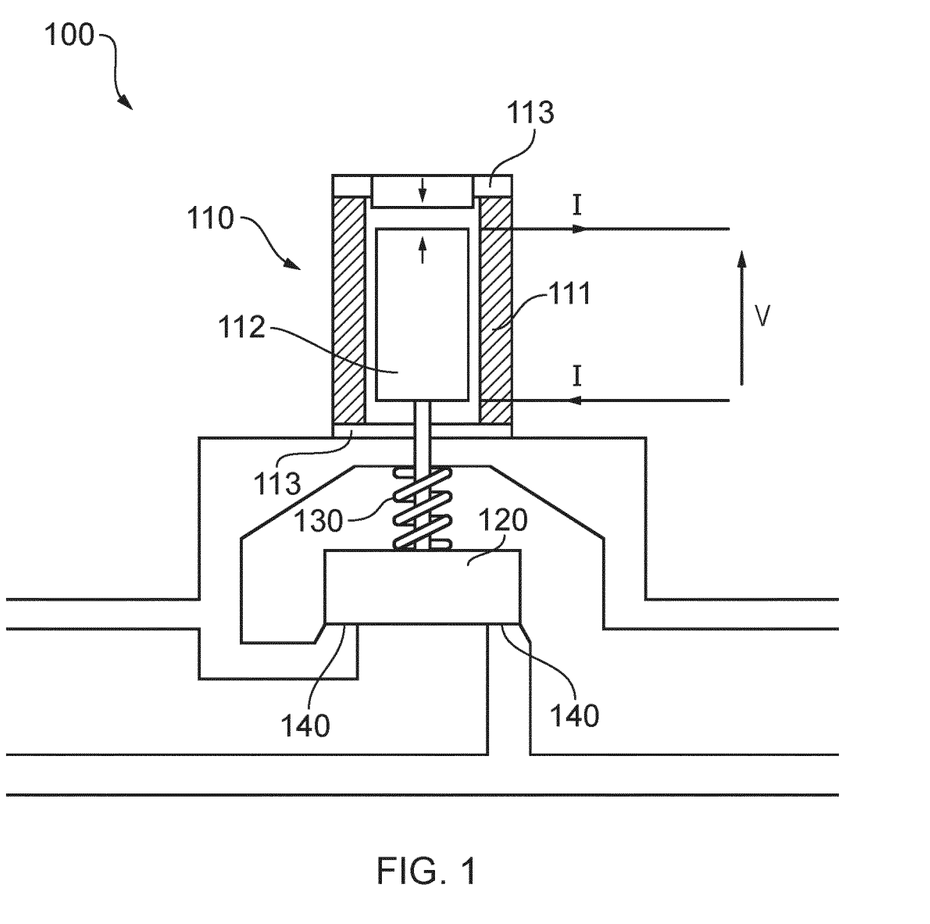
FIG. 1 shows a solenoid valve assembly suitable for performing a method according to embodiments of the present invention.

FIG. 1 shows a solenoid valve assembly 100 comprising a solenoid 110 (comprising a coil 111, an armature 112 and magnetic circuit elements 113) and a moveable plunger 120. When the solenoid is energised, the armature 112 and the magnetic circuit elements 113 are drawn towards one another in order to close the solenoid.

The valve assembly 100 of FIG. 1 is a normally closed valve and it is shown in its rest position, i.e. closed. A spring 130 holds the moveable plunger 120 down against a valve seat 140.

When a positive voltage is applied across the solenoid 110, a current flows through the solenoid 110, which energises it and creates a magnetic field. As a result of the magnetic field, the moveable plunger 120, which is made of a magnetic material, is pulled away from the valve seat 140 and towards the solenoid 110. Thus, the positive overboost voltage initiates movement of the moveable plunger 120 in order to accelerate it away from the valve seat 140, or more generally, in order to close the solenoid. This allows a flow path to be created in the valve assembly 100. When no voltage is applied across the solenoid 110, the solenoid 110 is de-energised and the force of the spring 130 restores the position of the plunger 120 against the valve seat 140.

It will be appreciated that whilst a normally closed valve assembly 100 is shown in FIG. 1, examples of the present invention equally apply to normally open valve assemblies. That is, the positive overboost voltage may initiate movement of the moveable plunger in order to accelerate it towards the valve seat, or more generally, in order to close the solenoid.

The movement of the moveable plunger 120 is controlled by a variety of factors, including the voltage applied across the solenoid 110, the current through the solenoid 110, the number of windings in the coil of the solenoid 110, the material of the moveable plunger 120 etc.

In some examples of the present invention, the voltage across the solenoid 110 is controlled. A controller (not shown in FIG. 1) controls the valve assembly to perform at least one of two methods, the first being a method of energising the solenoid by applying a positive overboost voltage and then a negative braking voltage, and the second being a method of energising the solenoid by applying a wait time, applying a positive overboost voltage, monitoring the solenoid closure time and adjusting one or more input variables.

In the first example method, a positive overboost voltage is applied across the solenoid 110 to actuate the moveable plunger to open or close a flow path through the valve assembly 100, wherein the overboost voltage comprises a voltage sufficient to dissipate at least two times the nominal power of the valve assembly 100 if the overboost voltage were applied for a time period sufficient to allow the current through the solenoid 110 to reach a steady state. The positive overboost voltage acts to accelerate the moveable plunger 120 away from the valve seat 140.

Then, a negative braking voltage is applied across the solenoid 110 to brake the movement of the plunger 120 by actively connecting a braking device (not shown in FIG. 1) across the solenoid 110. The braking device dissipates heat in the "braking" action and decelerates movement of the moveable plunger 120. The moveable plunger 120 may end its movement (i.e. complete its path of movement from the valve seat 140 to a resting position) during the application of the braking voltage to the solenoid 110, or it may end its movement during the application of a subsequent re-boost voltage to the solenoid 110.

Before application of the braking voltage, a first regulating voltage that is between the overboost drive voltage and the steady state drive voltage for the nominal power of the valve assembly 100 may be applied. A second regulating voltage between the first regulating drive voltage and the steady state drive voltage for the nominal power of the valve assembly 100 may also be applied after applying the first regulating voltage.

The re-boost voltage comprises a voltage sufficient to dissipate at least the nominal power of the valve assembly 100 if the re-boost voltage were applied for a time period sufficient to allow the current through the solenoid 110 to reach a steady state. In effect, the re-boost voltage also ensures that the moveable plunger 120 and/or its armature 112 remains in the energised position and does not accidentally move back towards the valve seat 140 before intended. In other examples, a separate hold voltage that is positive but lower than the re-boost voltage may be applied in order to achieve this effect.

In the second example method, the solenoid 110 is driven by a drive voltage. A demand signal is received to initiate actuation of the valve, a wait time is applied after receipt of the demand signal, wherein the drive voltage during the wait time is substantially zero volts, a positive overboost voltage is applied across the solenoid 110 to actuate the moveable plunger 120 to open or close a flow path through the valve assembly 100, wherein the overboost voltage comprises a voltage sufficient to dissipate at least two times the nominal power of the valve assembly 100 if the overboost voltage were applied for a time period sufficient to allow the current through the solenoid 110 to reach a steady state, the solenoid closure time is monitored, and one or more input variables are adjusted in order to control the solenoid closure time.

In either the first or second example methods, amongst others, the nominal power of the valve assembly could be 2 W and the overboost power that is applied across the solenoid could be between 60 and 100 W, for example. In cases where a first and optionally a second regulating voltage are used, the first regulating voltage could be between 30 and 60 W and the second regulating voltage could be 10 W. In cases where a re-boost voltage is used, the re-boost voltage could be the nominal power of 2 W. In cases where a hold voltage is used, the hold voltage could be 0.5 W.

In this illustration, the ratio of the power that would be dissipated if the overboost voltage were applied for a time period sufficient to allow the current through the solenoid to reach a steady state (hereinafter referred to as "overboost power") to the nominal power of the valve assembly is between 30 and 50. However, it will be appreciated that these values are given to illustrate the operating conditions under which the solenoid valve assembly of the present invention may operate, and are given as an example, only. A skilled person would recognise that other values can equally work. As a minimum, the ratio of overboost power to the nominal power of the valve assembly is 2:1.

The controller may also be configured to control the valve assembly to control the movement of the moveable plunger 120 so that the energisation cycles of the solenoid 110 can be monitored.

In this third example method, the solenoid closure time is monitored over a plurality of different energising and de-energising cycles of the solenoid, and an output is generated to indicate a need for valve maintenance based on changes to the monitored solenoid closure time between at least one first measured cycle and at least one second measured cycle.

Figure 2:
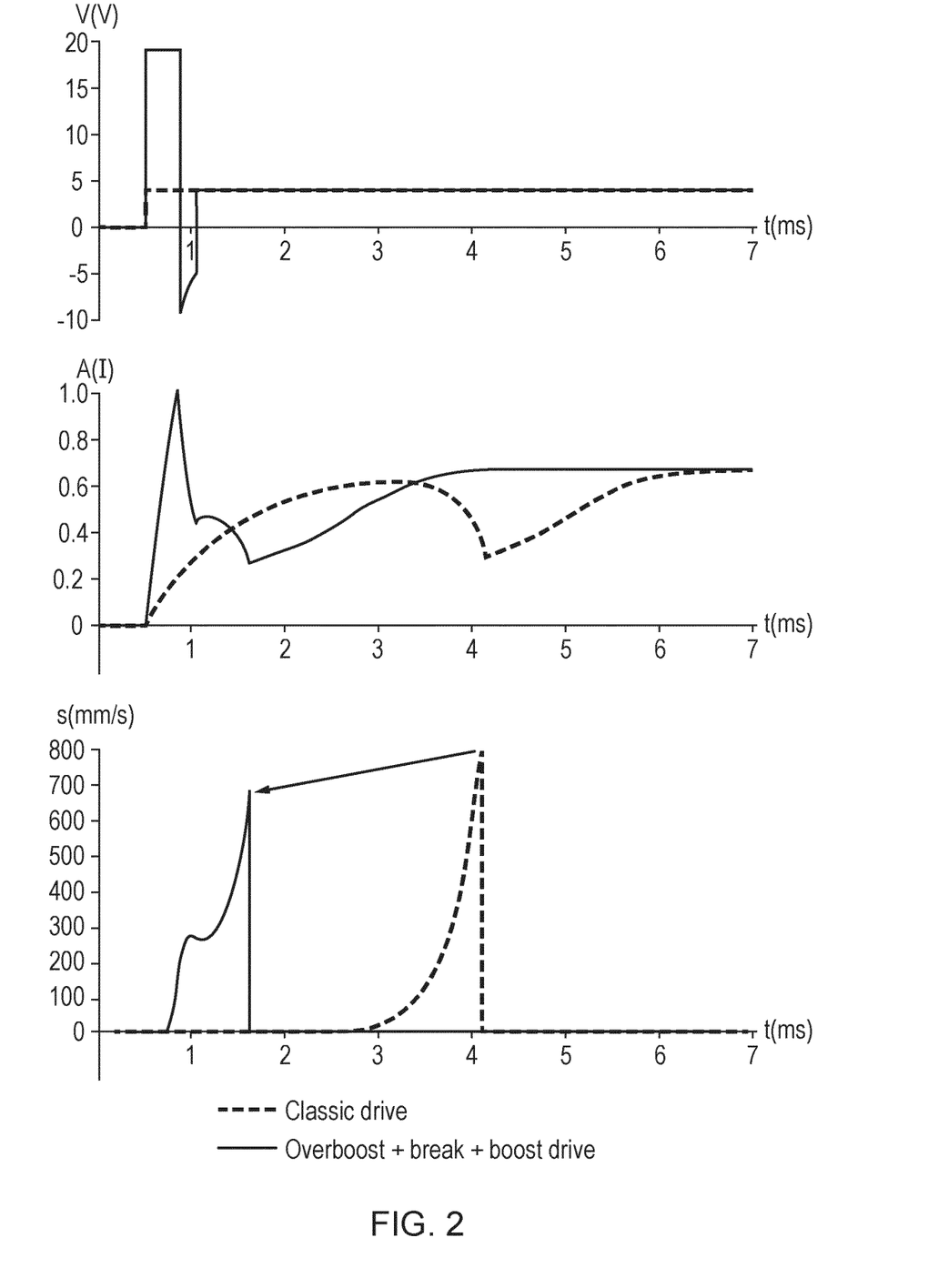
FIG. 2 is a series of graphs that illustrate some differences between a prior art valve assembly and a valve assembly in accordance with an embodiment of the present invention.

Various operational differences between a prior art valve assembly and a valve assembly in accordance with an embodiment of the present invention, such as that of FIG. 1, are shown in the three graphs of FIG. 2. The top graph shows voltage on the coil of the solenoid (or "coil-of-wire" solenoid) against time. The middle graph shows current through the coil of the solenoid against time. The bottom graph shows speed of the moveable plunger against time. In each of the graphs, the dashed line is representative of operation of a prior art valve assembly and the solid line is representative of operation of a valve assembly in accordance with an embodiment of the present invention.

The values for the prior art valve assembly and a valve assembly in accordance with an embodiment of the present invention are provided for illustrative purposes only. In other embodiments, different values may apply.

The prior art technique, i.e. the "classic drive", after a wait time of around 0.5 ms, a constant positive voltage of 4V is applied across the solenoid. Once the positive voltage is applied, the current through the solenoid is seen to ramp up until the armature begins to move at around 3 ms. The movement creates a back electromotive force which decreases the current as the armature accelerates, before abruptly increasing again at around 4 ms upon impact of the armature at its resting position, and finally plateauing at around a steady state current of 0.6 A. The speed of the moveable plunger increases exponentially from around 2.5 ms after the positive voltage is applied, and the moveable plunger continues accelerating until it reaches its end position at around 4.2 ms. The speed of the plunger when it reaches its final position is around 800 mm/s.

The technique according to an example of the present invention comprises applying a wait time of around 0.5 ms, applying an overboost voltage of 20V for 0.4 ms, then applying a braking voltage of between −10 and −5V for 0.2 ms, and then a re-boost voltage of 5V. The current response for this technique is more sophisticated than for the classic drive technique. When the overboost voltage is applied across the solenoid, the current ramps up very quickly and peaks at 1 A and the armature begins to accelerate. When the braking voltage is applied, the current drops very quickly down to 0.4 A, thus causing the acceleration of the armature to decrease and then causing the armature to decelerate. When the re-boost voltage is applied, the current initially drops as the armature starts to accelerate again, before abruptly increasing at around 1.7 ms upon impact of the armature at its resting position, and finally ramping up to a steady state current of 0.6 A. The moveable plunger starts its movement around 0.25 ms after the overboost voltage is applied (compared to around 2.5 ms for the classic drive) and it reaches its final position after around 1.6 ms (compared to around 4.2 ms for the classis drive). The speed of the plunger when it reaches its final position is around 680 mm/s (compared to around 800 mm/s for the classic drive).

The reduction in the time for the plunger to reach its final position by a factor of around 2.5 between the classic drive technique and the example of the present invention (the reduction in solenoid closure time, i.e. the time taken for the plunger to reach its final position minus the wait time, is by a factor of around 3.5), as well as the reduction in the plunger impact speed by around 15%, is made possible by the combination of the overboost voltage and the braking voltage. Of course, different combinations of overboost voltage and braking voltage can be envisaged in order to optimise solenoid closure time and plunger impact speed. Further, adding a regulating voltage, re-boost voltage and/or hold voltage can further shape the current response and plunger speed of the solenoid valve assembly.

Figure 3:
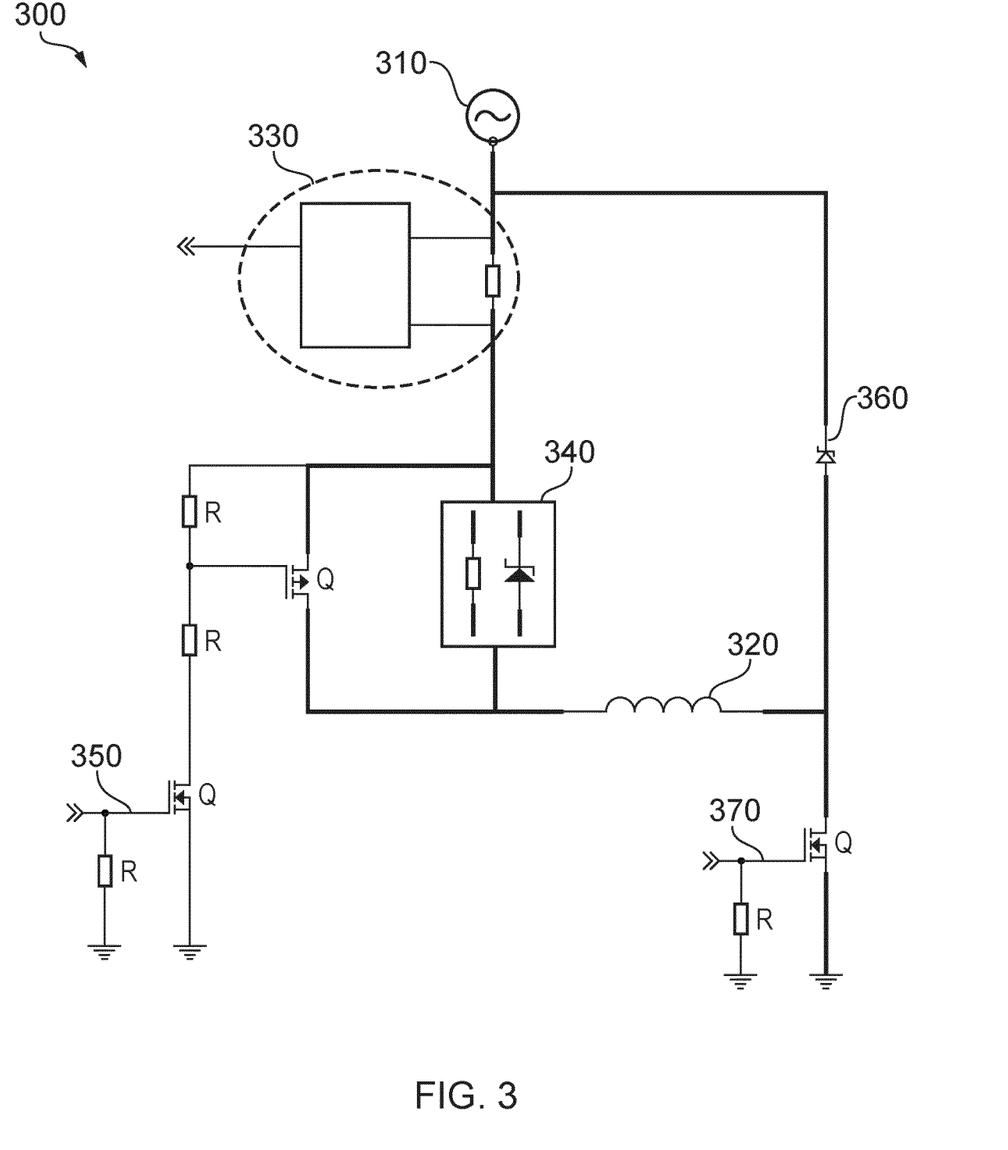
FIG. 3 is a circuit diagram of a controller for performing a method in accordance with embodiments of the present invention.

FIG. 3 shows a schematic of a controller for performing a method in accordance with an embodiment of the present invention. A circuit 300, which receives power from a power supply 310, may comprise one or more of: a coil 320 of a solenoid, a current shunt and sensing unit 330, a braking component 340 (which may be a resistor or a Zener diode), a brake drive 350, a freewheeling diode 360 and a PWM drive 370.

The signal that is detected at the current shunt and sensing unit 330 is processed at a microcontroller analog-to-digital converter (ADC) (not shown in FIG. 3).

The placement of the shunt allows a current reading to be taken during all phases (inside the freewheeling loop). The brake drive 350 is just one example of a switch that controls the braking component 340 to switch it on or off. Similarly, the PWM drive is just one example of a current control switch that regulates the voltage applied across the coil 320.

Figure 4A:
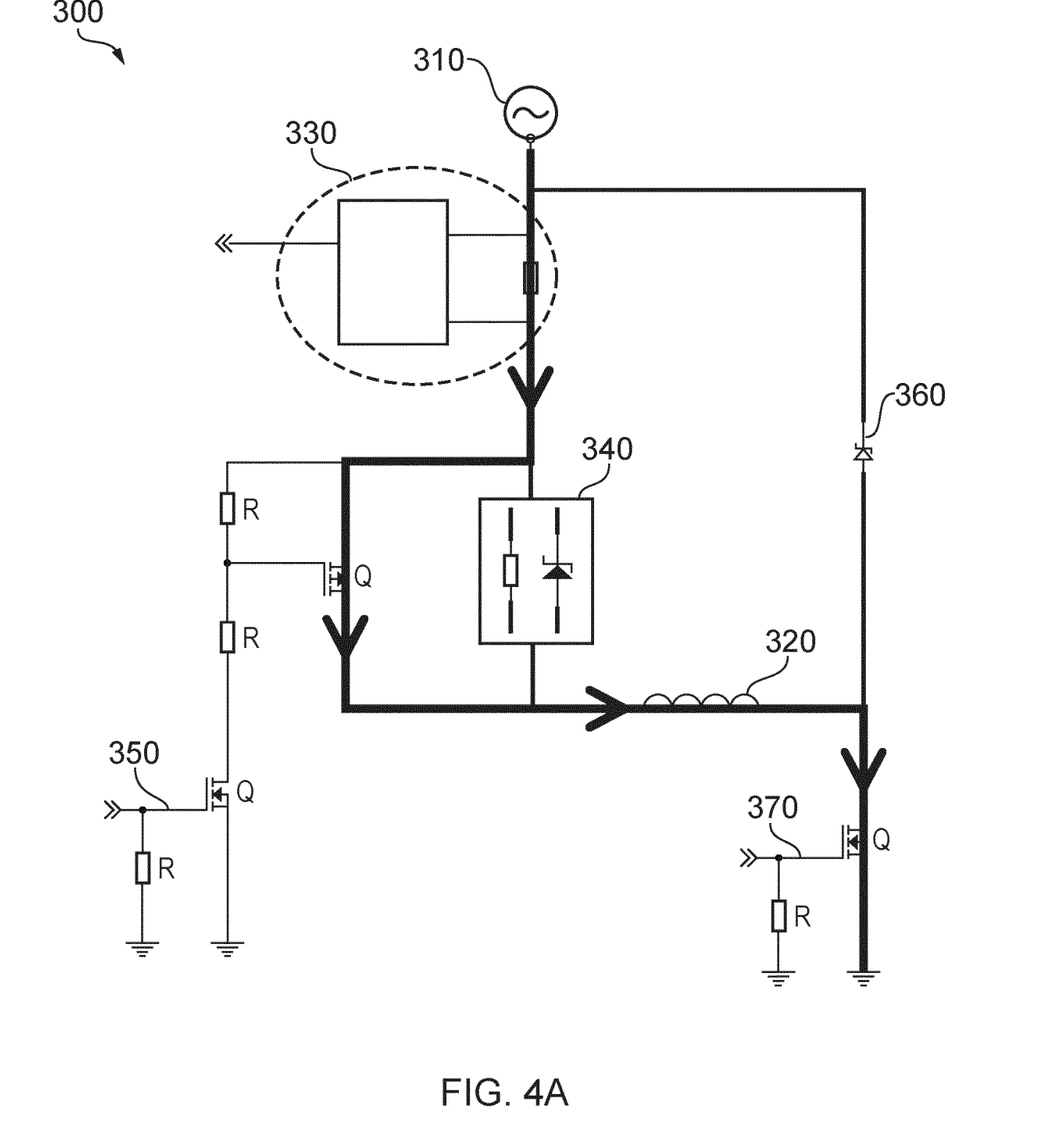
FIG. 4A is a circuit diagram of the controller of FIG. 3 showing the step of overboosting or holding in accordance with an embodiment of the present invention.
Figure 4B:
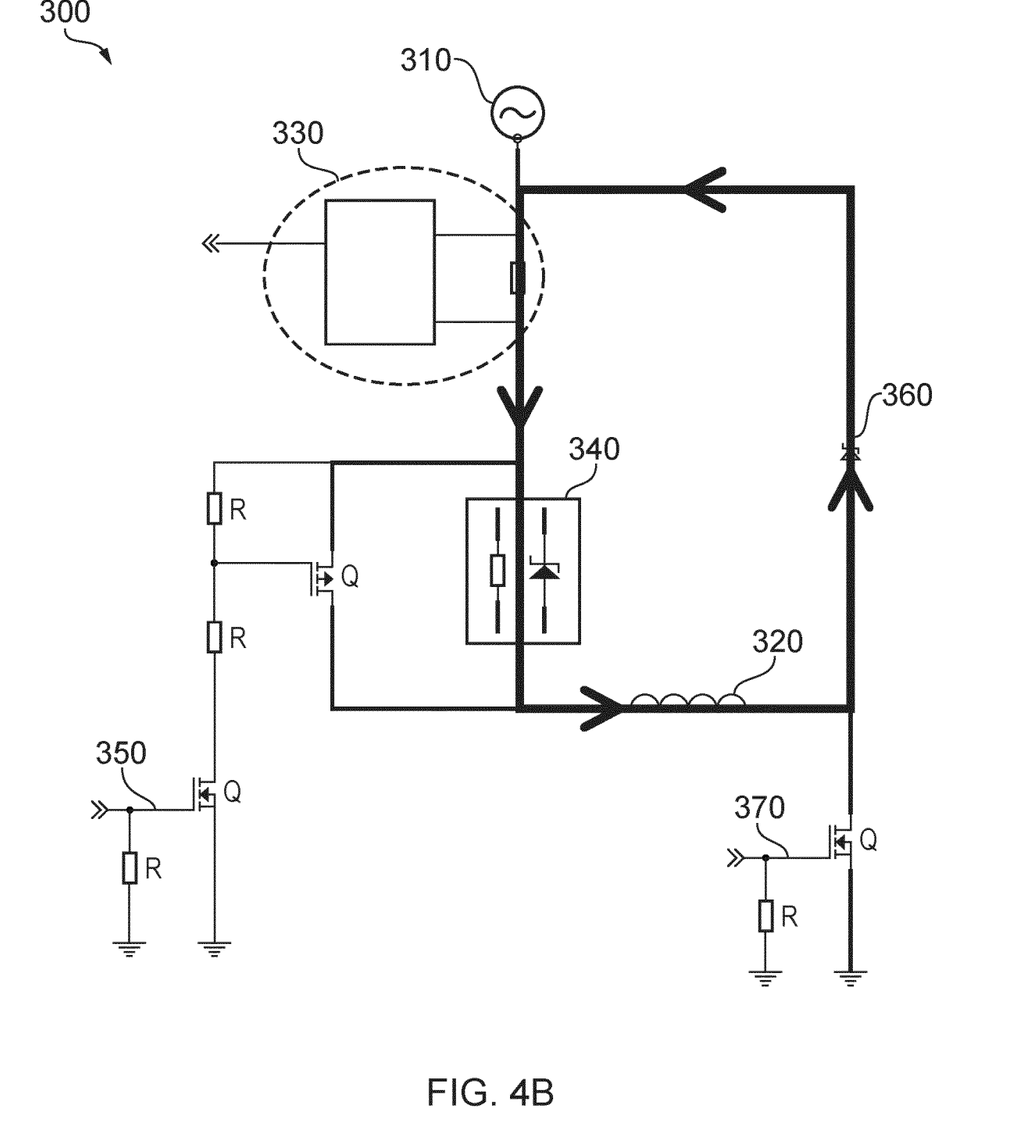
FIG. 4B is a circuit diagram of the controller of FIG. 3 showing the step of braking in accordance with an embodiment of the present invention.
Figure 4C:
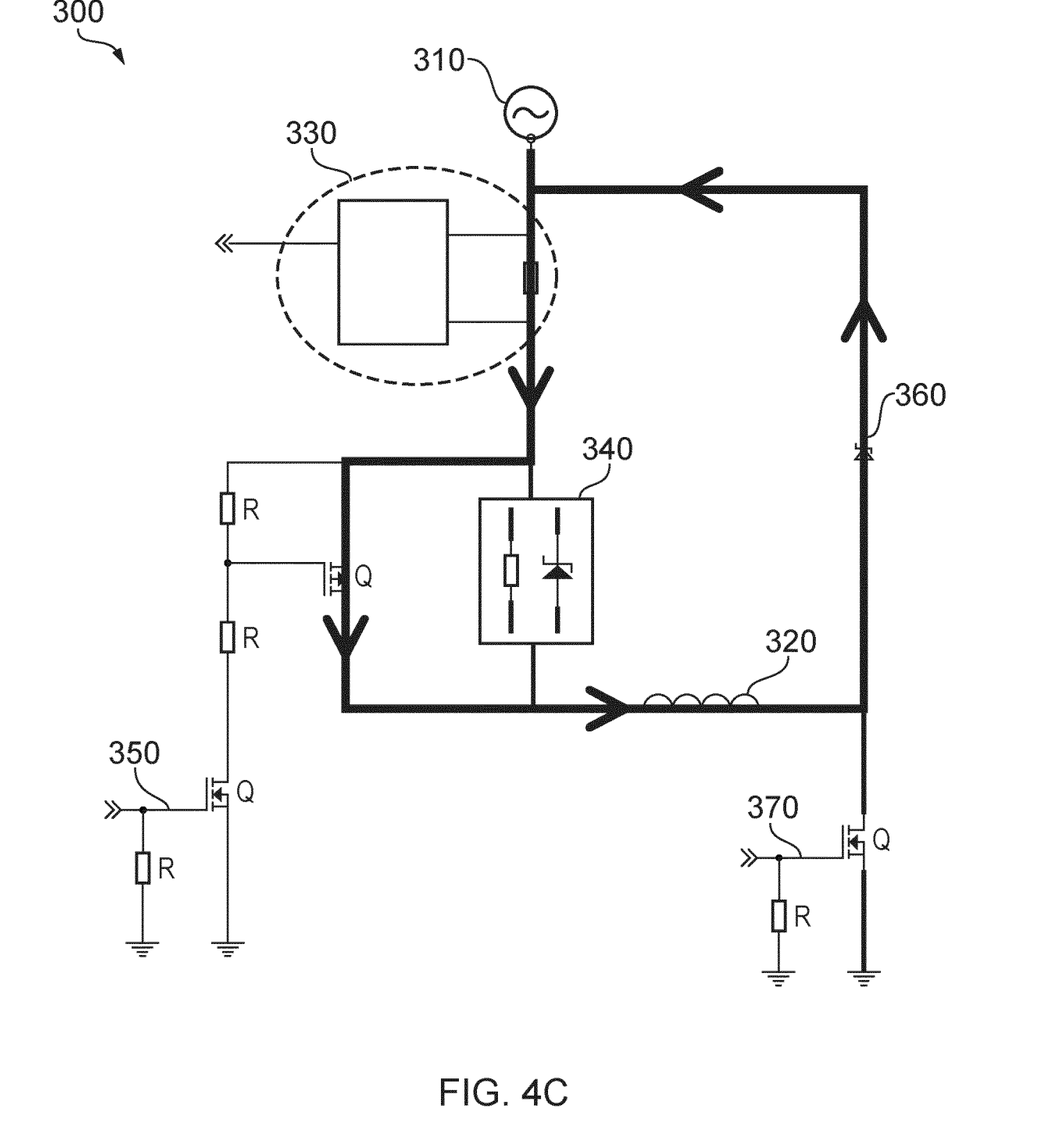
FIG. 4C is a circuit diagram of the controller of FIG. 3 showing the step of freewheeling in accordance with an embodiment of the present invention.

FIGS. 4A, 4B and 4C illustrate the circuit of FIG. 3 in operation in accordance with an embodiment of the present invention.

FIG. 4A illustrates the circuit in its ON phase, which represents one or more of the steps of applying a positive overboost voltage, a re-boost voltage or a hold voltage during the ON phase of PWM, for example. The current is shown to flow from the power supply 310, through the current shunt and sensing unit 330, to the coil 320 and the PWM drive 370, thus bypassing the braking component 340 (by virtue of the brake drive controlling the braking component 340 to be off). The freewheeling diode 360 stops back-flow of current from the power supply 310 to the PWM drive 370. The duty cycle of the PWM during overboost, re-boost and hold may be 100%, 50% and 25% respectively, although other values may apply in other embodiments.

FIG. 4B illustrates the circuit in its brake phase which represents the step of applying a negative braking voltage. The current is shown to flow in a loop through the current shunt and sensing unit 330, the braking component 340, and the freewheeling diode 360.

Figure 5:
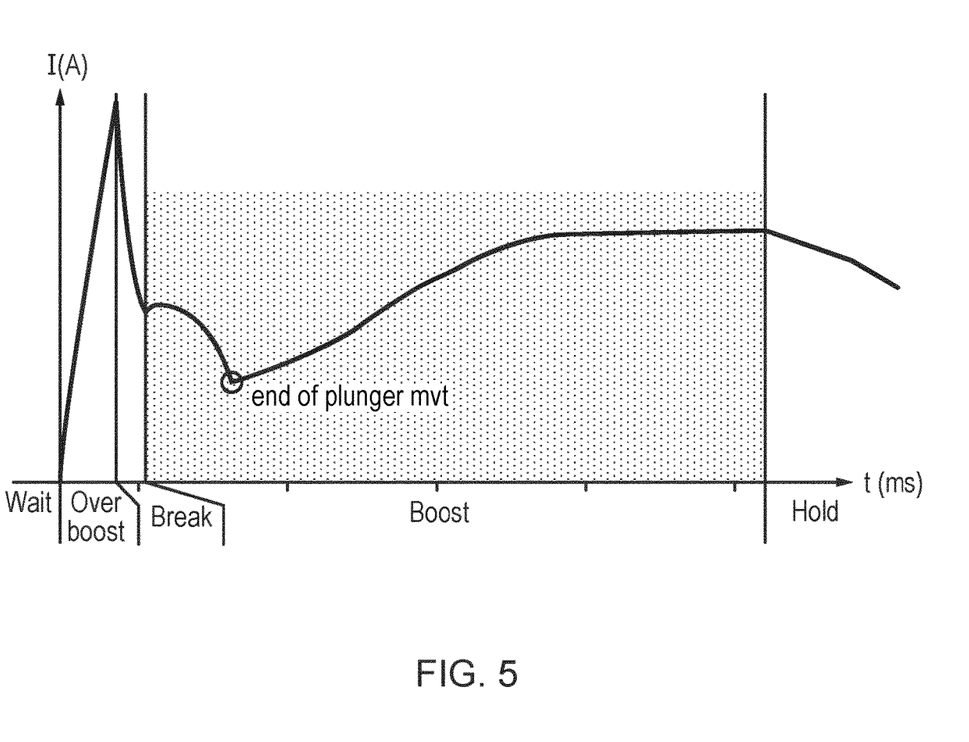
FIG. 5 is a graph that illustrates how current varies in a method in accordance with an embodiment of the present invention.

FIG. 4C illustrates the circuit in its OFF phase of PWM, which represents the step of freewheeling. The current is shown to flow in a loop through the current shunt and sensing unit 330 and the freewheeling diode 360 but bypassing the braking component 340 (by virtue of the brake drive controlling the braking component 340 to be off). FIG. 5 is a graph that conveys an example of how current is controlled and how movement of the plunger is detected in accordance with an embodiment of the present invention, for example, that of FIG. 3. The current shunt and sensing unit allows the current in the circuit to be sensed/detected during all phases of operation, including the steps of applying a positive overboost voltage, a re-boost voltage or a hold voltage. One way in which current sensing is used to detect movement of the plunger is described below.

When the moveable plunger reaches its end position, it hits a mechanical counterpart, for example, this could be a valve seat in a normally open valve, and the motion of the plunger instantaneously stops, as indicated in FIG. 5. It can also be seen in FIG. 5 that, in this example, the end of plunger movement occurs during the boost phase (i.e. during application of the re-boost voltage). The abrupt change in speed of the plunger creates a significant discontinuity in the current response due to the magnetic effect of the current and/or the induced back EMF in the solenoid coil.

Different techniques can be used to detect this discontinuity. The digital approach comprises digitally acquiring the current information and then performing suitable signal processing, for example, to detect the change of polarity of the signal derivative. In this example, the time taken for the valve to open is provided by the time taken for the discontinuity to occur. Another technique is to measure the time taken for the flow of fluid through the valve to reach a certain level using a flow sensor with a quick response time. Similarly, a well-positioned pressure sensor in the fluid flow path could be used to detect the switching time based upon a predetermined pressure.

Figure 6:
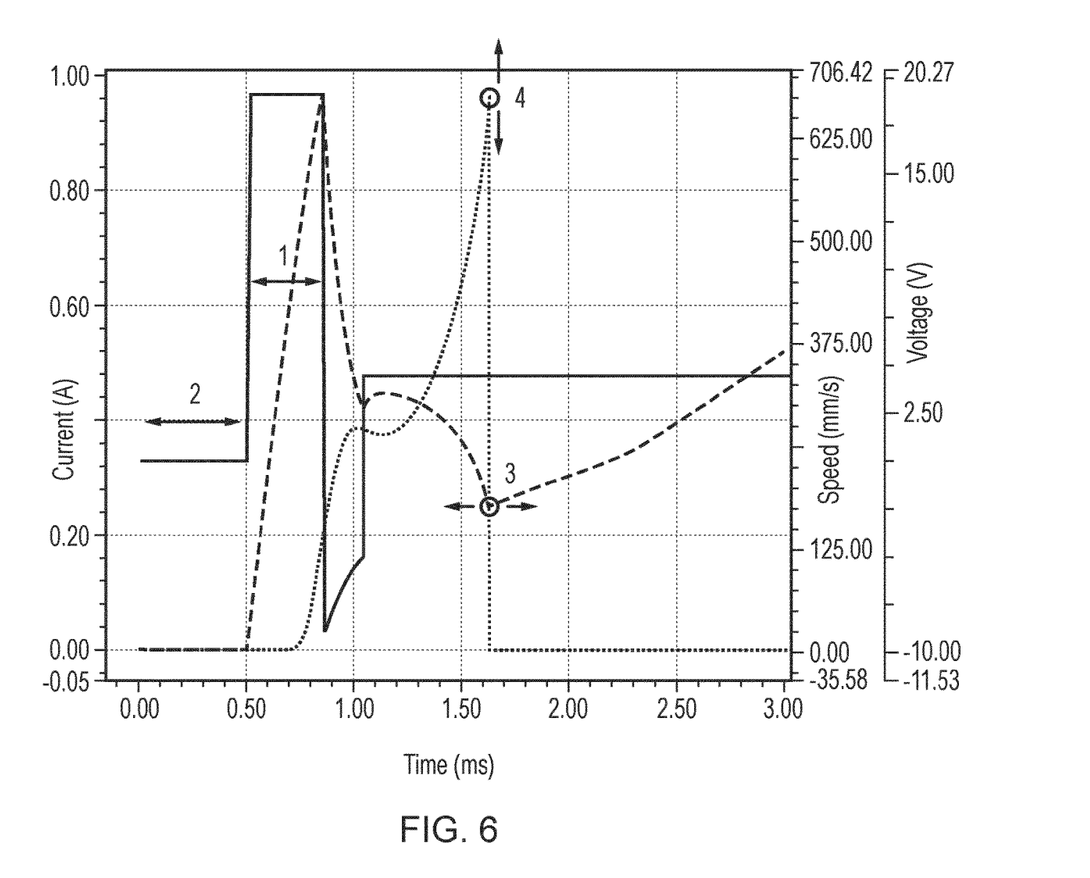
FIG. 6 is a graph that illustrates how various input variables can be used to control solenoid closure time in a method in accordance with the embodiment of the present invention of FIG. 5.

FIG. 6 is a graph that illustrates how variation of the input variables affects the output of the valve assembly, i.e. the movement of the plunger. Two output factors relating to the movement of the plunger of particular interest are the solenoid closure time, i.e. the time taken for the plunger to reach its final position, and the impact speed of the plunger.

In FIG. 6, the voltage is shown as a solid line, the current is shown as a dashed line, and the speed is shown as a dotted line.

Looking initially at FIG. 6 without considering adjustment of the input variables, it can be seen that between t=0.00 ms and t=0.50 ms, no voltage is applied to the solenoid, current through the solenoid is 0 A, and so the moveable plunger is static, i.e. speed is 0 mm/s.

The shape of the current graph is linked to two main parameters: the voltage applied across the solenoid and the movement of the moveable plunger. On one hand, a positive voltage being applied across the solenoid results in the current increasing (having logarithmic form) and the slope of the current curve depends on the inductance of the solenoid. On the other hand, the movement of the moveable plunger creates an electromotive force (also referred to as "back EMF"), which generates a negative voltage across the solenoid that induces a current in the solenoid. The combination of these two effects creates the shape of the current graph shown in FIG. 6.

At t=0.50 ms, an overboost voltage of about 20V is applied across the solenoid and current through the solenoid increases linearly until it reaches 0.96 A at t=0.90 ms, at which time the overboost voltage is replaced with a negative braking voltage of about −10V. From around t=0.75 ms, the moveable plunger begins its movement and its speed starts to increase as the moveable plunger accelerates.

Between t=0.90 ms and t=1.05 ms, the level of the negative braking voltage applied across the solenoid reduces to about −6.5V and the current through the solenoid reduces to about 0.44 A. The moveable plunger is decelerated by the application of the negative braking voltage.

At t=1.05 ms, the negative braking voltage is replaced by a re-boost voltage of about 5V. During the time from t=1.05 ms and before t=1.60 ms, the speed of the moveable plunger dips slightly due to the application of the braking voltage before it increases again due to application of the re-boost voltage. From t=1.05 ms, the current through the solenoid increases very slightly (due to the voltage applied to the solenoid being higher than the voltage generated by the electromotive force acting in the opposite direction) before falling in the re-boost phase (due to the voltage generated by the electromotive force being higher than the voltage applied to the solenoid) until the moveable plunger has been brought to a stop, at t=1.60 ms.

At t=1.60 ms, the motion of the moveable plunger is abruptly stopped, for example, by hitting a mechanical counterpart or the valve seat, and the current through the solenoid starts to increase again at this time. Without any motion of the moveable plunger, no electromotive force is created and so current through the solenoid is no longer influenced by movement of the moveable plunger. However, the application of the re-boost voltage causes the current through the solenoid to start increasing again.

Below, examples in which the input variables are adjusted for monitoring and optimisation purposes are considered.

In the case where the overboost time (1) is the input variable that is adjusted, it can be seen from FIG. 6 that an increase in the overboost time results in a reduced solenoid closure time and a higher final or maximum plunger speed (4) when it impacts upon the mechanical counterpart. Conversely, a decrease in the overboost time (1) results in an increased solenoid closure time (3) and a lower final or maximum plunger speed (4) when it impacts upon the mechanical counterpart.

Adjusting the wait time (2) also impacts upon the time taken for the plunger to reach its final position (3), i.e. the solenoid closure time. While the adjustment of wait time (2) has a simple and direct impact on the time taken for the plunger to reach its final position (3), the relationship between the overboost time (1) and the time taken for the plunger to reach its final position (3) is much more complex. For this reason, it may be simpler to make adjustments to the time taken for the plunger to reach its final position by adjusting the wait time (2). However, it may be advantageous to make adjustments to the overboost time (1) to also adjust the maximum plunger speed (4) or in cases where it is useful to re-set the wait time (2) to a predetermined value when it reaches zero or too large a value.

By monitoring the solenoid closure time over a plurality of different energising and de-energising cycles of the solenoid, and generating an output to indicate a need for valve maintenance based on changes to the monitored solenoid closure time between at least one first measured cycle and at least one second measured cycle, the lifetime of the solenoid valve assembly may be improved. If an output indicates that the solenoid closure time is changing quickly over time, for example, this may indicate that valve maintenance should be performed.

The above description relates to four particularly preferred aspects of the invention, but it will be appreciated that other implementations are possible. Variations and modifications will be apparent to the skilled person, such as equivalent and other features which are already known and which may be used instead of, or in addition to, features described herein. Features that are described in the context of separate aspects or embodiments may be provided in combination in a single aspect or embodiment. Conversely, features which are described in the context of a single aspect or embodiment may also be provided separately or in any suitable sub-combination.

The invention claimed is:

1. A method of operating a solenoid valve assembly, wherein the solenoid is driven by a drive voltage, the method comprising the steps of:

monitoring the solenoid closure time over a plurality of different energising and de-energising cycles of the solenoid, wherein an energising and de-energising cycle comprises:
applying a positive overboost voltage across the solenoid to create a force so as to actuate a moveable plunger to open or close a flow path through the valve assembly, wherein the overboost voltage comprises a voltage to dissipate at least two times the nominal power of the valve assembly if the overboost voltage were applied for a time period to allow the current through the solenoid to reach a steady state; and
generating an output to indicate a need for valve maintenance based on changes to the monitored solenoid closure time between at least one first measured cycle and at least one second measured cycle.

2. The method according to claim 1, wherein the step of monitoring the solenoid closure time comprises monitoring the shape of the current response.

3. The method according to claim 1, wherein an energising and de-energising cycle further comprises:
after applying the positive overboost voltage, then applying a negative braking voltage across the solenoid to brake the movement of the plunger, by actively connecting a braking device across the solenoid.

4. The method according to claim 1, wherein the step of applying the overboost voltage comprises applying the overboost voltage for a time period for the instantaneous power dissipated in the solenoid to reach a predetermined power level.

5. The method according to claim 1, wherein the overboost voltage is applied for a predetermined period of time.

6. The method according to claim 1, wherein the method further comprises:
regulating the drive voltage at a first regulating voltage between the overboost drive voltage and the steady state drive voltage for the nominal power of the valve after applying the overboost voltage.

7. The method according to claim 6, wherein the method further comprises:
regulating the drive voltage at a second regulating drive voltage between the first regulating drive voltage and the steady state drive voltage for the nominal power of the valve, after applying the first regulating voltage.

8. The method according to claim 6, wherein the method further comprises:
adapting the overboost voltage to the lower first and/or second regulating voltage by controlling the voltage across the solenoid once the power has reached a predetermined level or by controlling the current through the solenoid once the current has reached a predetermined level.

9. The method according to claim 6, wherein the step(s) of regulating comprise(s) reducing the duty cycle of a pulse width modulation signal to reduce the voltage across the solenoid or to reduce the current through the solenoid.

10. The method according to claim 6, wherein the step(s) of regulating comprise(s) controlling a current by making a dynamic adjustment of the duty cycle of a pulse width modulation signal in order to regulate the current through the solenoid at a predetermined level.

11. The method according to claim 1, wherein the method further comprises:
applying a re-boost voltage across the solenoid after applying the braking voltage, wherein the re-boost voltage comprises a voltage to dissipate at least the nominal power of the valve assembly if the re-boost voltage were applied for a time period to allow the current through the solenoid to reach a steady state, wherein the step of applying the re-boost voltage comprises applying the re-boost voltage for a time period for the instantaneous power dissipated in the solenoid to reach a predetermined power level.

12. The method according to claim 1, wherein the method further comprises:
applying a hold voltage across the solenoid after applying the braking voltage, and optionally after applying the re-boost voltage, wherein the step of applying the hold voltage comprises reducing the duty cycle of a pulse width modulation signal to reduce the voltage across the solenoid or to reduce the current through the solenoid, or controlling a current by making a dynamic adjustment of the duty cycle of a pulse width modulation signal in order to regulate the current through the solenoid at a predetermined level.

13. The method according to claim 1, wherein the step of applying the overboost voltage causes the flow path to open for a normally closed valve assembly and causes the flow path to close for a normally open valve assembly.

14. The method according to claim 1, the method further comprising the steps of:
receiving a demand signal to actuate the valve;
applying a wait time after receipt of the demand signal, wherein the drive voltage during the wait time is substantially zero volts;
monitoring the solenoid closure time; and
adjusting one or more input variables in order to control the solenoid closure time.

15. A controller for controlling operation of a solenoid valve assembly,
wherein the controller is configured to control the valve assembly to perform the method of claim 14.

16. The method according to claim 14, wherein the solenoid closure time is adjusted in response to a difference between the monitored solenoid closure time and a predetermined target solenoid closure time.

17. The method according to claim 16, wherein a cycle comprises at least the steps of applying a wait time and applying an overboost voltage, and wherein the step of adjusting one or more input variables in order to control the solenoid closure time comprises:
adjusting the wait time once every a first integer number of cycles; and
adjusting the overboost time and/or the overboost voltage once every a second integer number of cycles.

18. The method according to claim 17, wherein the first integer number is equal to the second integer number.

19. The method according to claim 17, wherein the first integer number is different from, preferably lower than, the second integer number.

20. The method according to claim 14, wherein the input variables comprise at least one of the wait time, the overboost time, the overboost voltage, the re-boost time, the re-boost voltage and the brake time.

* * * * *